US010241926B2

United States Patent
Patel et al.

(10) Patent No.: US 10,241,926 B2
(45) Date of Patent: *Mar. 26, 2019

(54) MIGRATING BUFFER FOR DIRECT MEMORY ACCESS IN A COMPUTER SYSTEM

(71) Applicant: International Business Machines Corporation, Armonk, NY (US)

(72) Inventors: Mehulkumar J. Patel, Bangalore (IN); Venkatesh Sainath, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/852,209

(22) Filed: Dec. 22, 2017

(65) Prior Publication Data

US 2018/0137059 A1  May 17, 2018

Related U.S. Application Data

(63) Continuation of application No. 14/868,537, filed on Sep. 29, 2015, now Pat. No. 9,886,394, which is a (Continued)

(51) Int. Cl.
*G06F 13/28* (2006.01)
*G06F 12/1081* (2016.01)
(Continued)

(52) U.S. Cl.
CPC ...... *G06F 12/1081* (2013.01); *G06F 13/1673* (2013.01); *G06F 13/28* (2013.01);
(Continued)

(58) Field of Classification Search
None
See application file for complete search history.

(56) References Cited

U.S. PATENT DOCUMENTS

| 5,727,150 A | 3/1998 | Laudon et al. |
| 6,766,424 B1 | 7/2004 | Wilson |

(Continued)

FOREIGN PATENT DOCUMENTS

CN  102750244 B  3/2015

OTHER PUBLICATIONS

Kotta et al., "Tracking Statistics Corresponding to Data Access in a Computer," U.S. Appl. No. 14/264,082, filed Apr. 29, 2014.
(Continued)

*Primary Examiner* — Henry Tsai
*Assistant Examiner* — Dean Phan
(74) *Attorney, Agent, or Firm* — Scott S. Dobson

(57) ABSTRACT

A computer-implemented method for migrating a buffer used for direct memory access (DMA) may include receiving a request to perform a DMA data transfer between a first partitionable endpoint and a buffer of a first memory in a system having two or more processor chips. Each processor chip may have an associated memory and one or more partitionable endpoints. The buffer from the first memory may be migrated to a second memory based on whether the first memory is local or remote to the first partitionable endpoint, and based on a DMA data transfer activity level. A memory is local to a partitionable endpoint when the memory and the partitionable endpoint are associated with a same processor chip. The DMA data transfer may then be performed.

14 Claims, 6 Drawing Sheets

Related U.S. Application Data continuation of application No. 14/565,475, filed on Dec. 10, 2014, now Pat. No. 9,563,572.

(51) Int. Cl.
*G06F 13/16* (2006.01)
*G06F 13/42* (2006.01)
*G06F 13/40* (2006.01)

(52) U.S. Cl.
CPC ........ *G06F 13/404* (2013.01); *G06F 13/4282* (2013.01); *G06F 2212/656* (2013.01)

(56) References Cited

U.S. PATENT DOCUMENTS

| | | | |
|---|---|---|---|
| 7,984,203 | B2 | 7/2011 | Madukkarumukumana et al. |
| 8,621,120 | B2 | 12/2013 | Bender et al. |
| 8,984,179 | B1 | 3/2015 | Cardona et al. |
| 9,015,397 | B2 | 4/2015 | Sharifie et al. |
| 9,092,429 | B2 | 7/2015 | Higham et al. |
| 9,304,799 | B2 | 4/2016 | Kotta et al. |
| 9,304,811 | B2 * | 4/2016 | Yao ....................... G06F 9/4856 |
| 2003/0204648 | A1 | 10/2003 | Ardnt |
| 2007/0233967 | A1 | 10/2007 | Rangarajan et al. |
| 2007/0260768 | A1 * | 11/2007 | Bender ............... G06F 12/1081 710/22 |
| 2010/0005261 | A1 | 1/2010 | Shiga et al. |
| 2010/0318756 | A1 * | 12/2010 | Yoshinari .............. G06F 3/0613 711/162 |
| 2012/0254582 | A1 | 10/2012 | Raj et al. |
| 2013/0326109 | A1 * | 12/2013 | Kivity .................. G06F 9/5016 711/6 |
| 2014/0129797 | A1 | 5/2014 | Amdt et al. |
| 2014/0143781 | A1 | 5/2014 | Yao |
| 2017/0155717 | A1 | 6/2017 | Tamir et al. |

OTHER PUBLICATIONS

Kotta et al., "Tracking Statistics Corresponding to Data Access in a Computer," U.S. Appl. No. 14/311,482, filed Jun. 23, 2014.
Patel, et al., "Migrating Buffer for Direct Memory Access in a Computer System," U.S. Appl. No. 14/565,475, filed Dec. 10, 2014.
Patel, et al., "Migrating Buffer for Direct Memory Access in a Computer System," U.S. Appl. No. 14/868,537, filed Sep. 29, 2015.
List of IBM Patents or Patent Applications Treated as Related, dated Dec. 22, 2017, 2 pages.

* cited by examiner

300

| REAL PAGE NUMBER (RPN) | ACCESS CONTROL (RO/RW/WO) | PROCESSOR CHIP NUMBER | NUMBER OF BYTES IN DMA TRANSFER |
|---|---|---|---|
| 18 | RO | 130 | 4 KB |

| REAL PAGE NUMBER (RPN) | ACCESS CONTROL (RO/RW/WO) | PROCESSOR CHIP NUMBER | DMA COUNT PERFORMED ON BUFFER |
|---|---|---|---|
| 12 | WO | 130 | 1 |

| PE ID | RPN 40 | RPN 42 | RPN 44 | RPN 46 |
|---|---|---|---|---|
| 123 | 30 | 2 | 34 | 0 |
| 124 | 30 | 5 | 9 | 5 |
| 133 | 15 | 0 | 12 | 9 |
| 134 | 8 | 0 | 0 | 15 |
| 163 | 15 | 3 | 2 | 18 |
| 164 | 5 | 0 | 13 | 10 |
| 173 | 0 | 8 | 23 | 3 |
| 174 | 3 | 2 | 4 | 8 |

FIG. 5

MIGRATING BUFFER FOR DIRECT MEMORY ACCESS IN A COMPUTER SYSTEM

BACKGROUND

Embodiments relate generally to data transfers in computer systems, and more particularly, to direct memory access (DMA) data transfers.

A computer system, such as a symmetric multiprocessing system, may include multiple server nodes and on each server node there may be multiple processor chips (instances of central processing units). Moreover, each processor chip may include a memory. The processor chips may be connected to a plurality of partitionable endpoints (e.g., input/output adapters). The server nodes may be connected by one or more inter node buses, and the processor chips may be connected by one or more intra node buses.

A central processing unit (CPU) executes instructions contained in a computer program. Certain program instructions, when executed by the CPU, cause data to be transferred from memory to a partitionable endpoint or from a partitionable endpoint to memory. This is sometimes referred to as programmed memory input/output. DMA is another technique for transferring data. Once a DMA transfer is initiated, the data transfer bypasses the CPU. A separate circuit, such as a PCI host bridge (PHB) controller, temporarily takes control of a bus from the CPU and transfers data from memory to a particular partitionable endpoint or from the partitionable endpoint to memory. The memory includes a particular memory address, which contains the data the partitionable endpoint will access in the DMA data transfer, known as a buffer. The buffer may be within a memory that is local to the partitionable endpoint. Alternatively, the buffer may be within a memory that is remote to the partitionable endpoint. In cases where the memory is remotely attached, the memory that contains the buffer may be attached to a server node or processor chip that is different than the server node or processor chip the partitionable endpoint is attached to.

SUMMARY

Various embodiments are directed to a computer-implemented method for migrating a buffer used for direct memory access (DMA). The method can include receiving a request to perform a DMA data transfer between a first partitionable endpoint and a buffer of a first memory in a system having two or more processor chips, each processor chip having an associated memory and one or more partitionable endpoints. The method can also include determining whether to migrate the buffer from the first memory to a second memory based on whether the first memory is local or remote to the first partitionable endpoint, and based on a DMA data transfer activity level, wherein a memory is local to a partitionable endpoint when the memory and the partitionable endpoint are associated with a same processor chip. Moreover, the method can include performing the DMA data transfer.

Various embodiments are directed to a system for migrating a buffer used for direct memory access (DMA). The system can include a computing system having two or more processor chips, each processor chip having an associated memory and one or more partitionable endpoints. Each processor chip, the associated memory, and the one or more partitionable endpoints, are operable to perform the following operations: an operation to receive a request to perform a DMA data transfer between a first partitionable endpoint and a buffer of a first memory. In addition, an operation to determine whether to migrate the buffer from the first memory to a second memory based on whether the first memory is local or remote to the first partitionable endpoint, and based on a DMA data transfer activity level, wherein a memory is local to a partitionable endpoint when the memory and the partitionable endpoint are associated with a same processor chip. Moreover, an operation to perform the DMA data transfer.

Various embodiments are directed to a computer program product. The computer program product comprises a computer readable storage medium having program code embodied therewith. The program code comprises computer readable program code that may be configured for receiving a request to perform a DMA data transfer between a first partitionable endpoint and a buffer of a first memory in a system having two or more processor chips, each processor chip having an associated memory and one or more partitionable endpoints. In addition, the computer readable program code may be configured for determining whether to migrate the buffer from the first memory to a second memory based on whether the first memory is local or remote to the first partitionable endpoint, and based on a DMA data transfer activity level, wherein a memory is local to a partitionable endpoint when the memory and the partitionable endpoint are associated with a same processor chip. Moreover, the computer readable program code may be configured for performing the DMA data transfer.

BRIEF DESCRIPTION OF THE DRAWINGS

FIG. 3A is an example of a translation control entry (TCE), and all of the fields that can reside therein, including a "number of bytes in DMA transfer" field.

FIG. 3B is another example of a TCE, which includes a "DMA count performed on buffer" field.

FIG. 5 is a DMA statistics table 500 that shows an example of a cumulative tracking record for DMA data transfers performed in the data processing environment 100 on particular RPNs (buffers) over a period of time.

DETAILED DESCRIPTION

Figure 1:
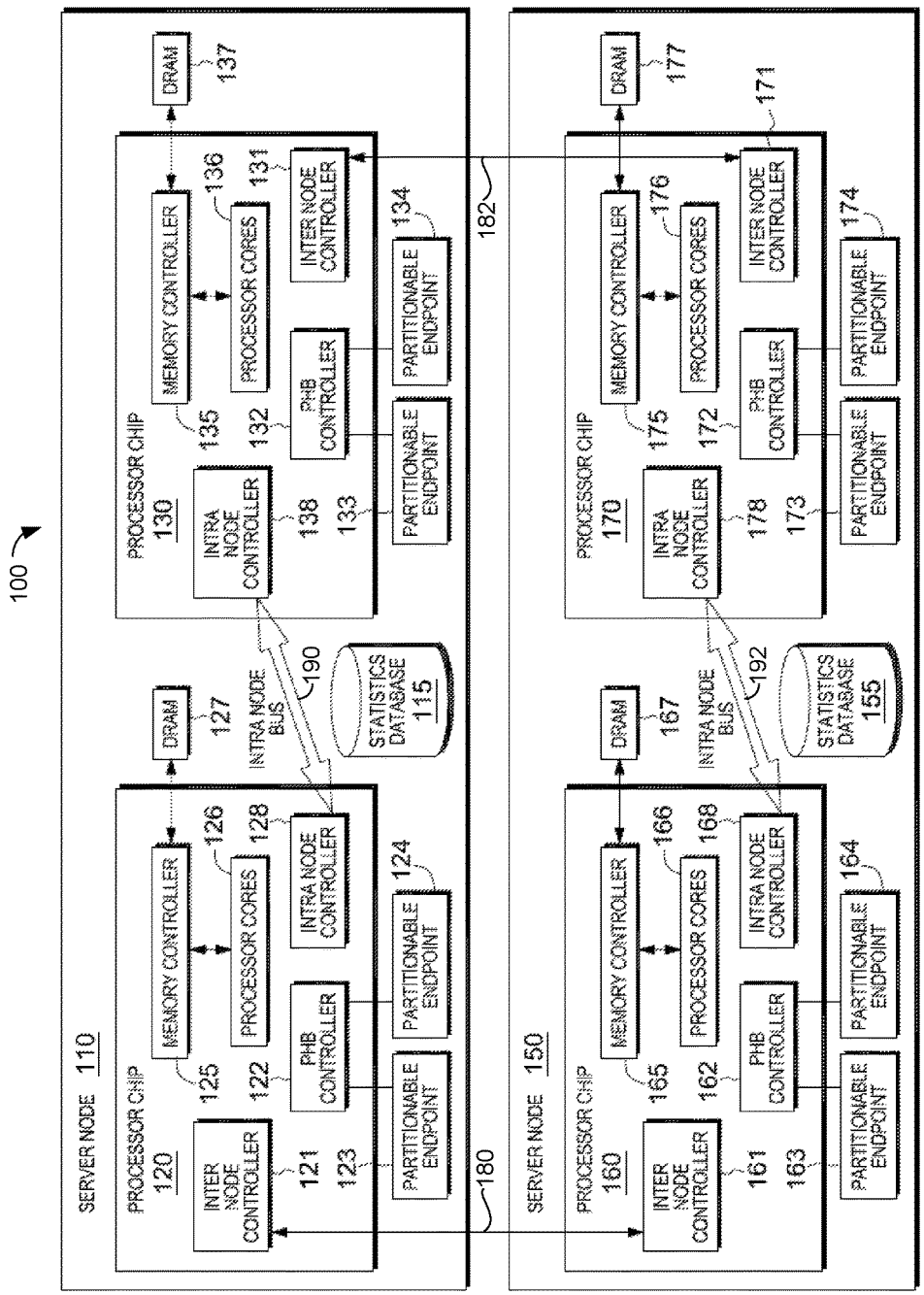
FIG. 1 is a functional block diagram of a data processing environment in accordance with an embodiment of the present disclosure.

In the drawings and the Detailed Description, like numbers generally refer to like components, parts, steps, and processes.

Embodiments of the present disclosure recognize that in computing environments that include multiple server nodes (e.g., blade servers operating in a symmetric multiprocessing (SMP) configuration, or other systems in an SMP configuration), I/O devices are located throughout the computing environment. In many examples, the I/O devices (e.g., sound cards, graphics cards, Peripheral Component Interconnect Express (PCIe) devices, etc.) may be located in a different server node of the computing environment relative to the execution location of a workload that is utilizing the I/O device.

The present disclosure will now be described in detail with reference to the Figures. FIG. 1 is a functional block diagram illustrating data processing environment 100, in accordance with one embodiment of the present disclosure. An embodiment of data processing environment 100 includes server nodes 110 and 150. In example embodiments, server nodes 110 and 150 can be desktop computers, computer servers, or any other computer systems known in the art capable of performing functions in accordance with embodiments of the present disclosure. In certain embodiments server nodes 110 and 150 represent computer systems utilizing clustered computers and components (e.g., database server computers, application server computers, etc.) that act as a single pool of seamless resources when accessed by elements of data processing environment 100 (e.g., server nodes 110 and 150). In general, server nodes 110 and 150 are representative of any electronic device or combination of electronic devices capable of executing machine readable program instructions, as described in greater detail with regard to FIG. 6, in accordance with embodiments of the present disclosure.

In one embodiment, server nodes 110 and 150 are part of a cluster of server nodes that can include additional instances of server nodes. For example, server nodes 110 and 150 can be nodes of an SMP server or blade servers that are operating in a SMP configuration. In one embodiment, server nodes 110 and 150 can be partitioned into one or more virtual computing platforms (e.g., via logical partitioning (LPAR)). In another embodiment, server nodes 110 and 150 are partitions of a server computer.

Figure 6:
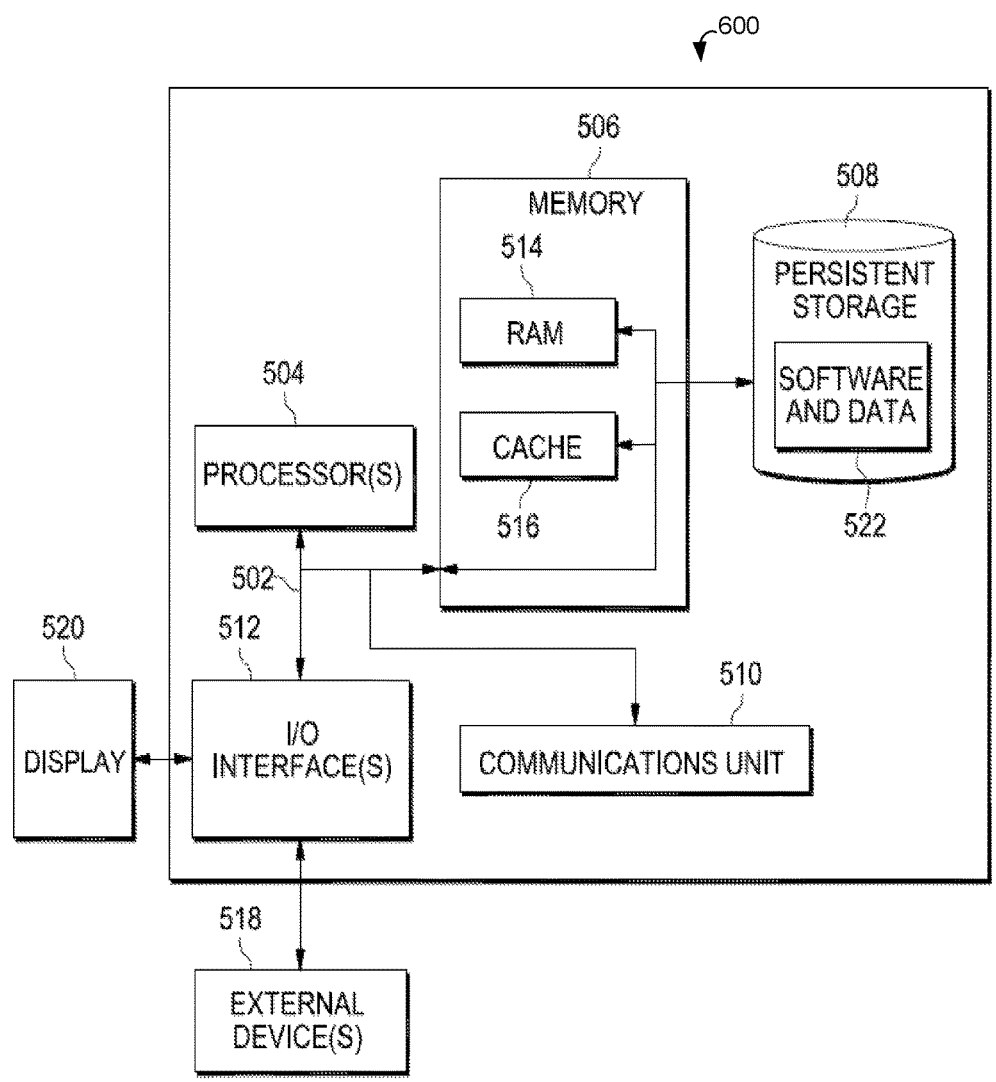
FIG. 6 depicts a block diagram of components of the computing systems of FIG. 1 in accordance with an embodiment of the present disclosure.

In one embodiment, server node 110 includes statistics database 115, processor chips 120 and 130, partitionable endpoints 123, 124, 133 and 134, and DRAM 127 and 137, and server node 150 includes statistics database 155, processor chips 160 and 170, partitionable endpoints 163, 164, 173 and 174, and DRAM 167 and 177. DRAM 127, 137, 167 and 177 are instances of dynamic random-access memory that are included on respective server nodes 110 and 150. In other embodiments, server nodes 110 and 150 can include other forms of data storage devices and other forms of suitable volatile or non-volatile computer readable storage media. Statistics databases 115 and 155 store statistics corresponding to Direct Memory Access (DMA) data transfers within server nodes 110 and 150. In example embodiments, the statistics data that is stored in statistics databases 115 and 155 is determined and tracked by system software. Statistic databases 115 and 155 can be implemented with any type of storage device, for example, persistent storage 508 (as shown in FIG. 6), which is capable of storing data that may be accessed and utilized by server nodes 110 and 150, such as a database server, a hard disk drive, or flash memory. In other embodiments, statistic databases 115 and 155 can represent multiple storage devices within server nodes 110 and 150.

In one embodiment, partitionable endpoints 123, 124, 133, 134, 163, 164, 173 and 174 are devices that are capable of initiating DMA data transfers on memory (e.g., DRAM 127, 137, 167 and 177) located within server nodes 110 and 150. In example embodiments, partitionable endpoints 123, 124, 133, 134, 163, 164, 173 and 174 are PCI or PCIe I/O devices, such as sound cards, graphics cards, Ethernet devices, and storage controller devices. Partitionable endpoints 123, 124, 133, 134, 163, 164, 173 and 174 can be internal components of server nodes 110 and 150. In other embodiments, partitionable endpoints 123, 124, 133, 134, 163, 164, 173 and 174 can be external components to server nodes 110 and 150, or components that are connected to server nodes 110 and 150 via network communications (e.g., Ethernet devices).

Processor chips 120, 130, 160 and 170 are located within respective server nodes 110 and 150. In other embodiments, server nodes 110 and 150 can include additional processor chips, and processor chips 120, 130, 160 and 170 can be partitioned in one or more virtual machines. Processor chips 120, 130, 160 and 170 include respective instances of internal components that include: inter node controllers 121, 131, 161 and 171, PCI Host Bridge (PHB) controllers 122, 132, 162 and 172, memory controllers 125, 135, 165 and 175, processor cores 126, 136, 166 and 176, and intra node controllers 128, 138, 168 and 178. In other embodiments, the internal components of processor chips 120, 130, 160 and 170 can be located within respective server nodes 110 and 150.

Inter node controllers 121, 131, 161 and 171 control communications and transfer of data between processor chips on different server nodes (e.g., between processor chips 120 and 130 on server node 110 and processor chips 160 and 170 on server node 150) through one or more inter node buses 180 and 182. In various embodiments, each instance of inter node controllers 121, 131, 161 and 171 has the capability to communicate and transfer data with any other instance of inter node controllers 121, 131, 161 and 171 that resides on another server node. For example, inter node controller 121 on server node 110 can communicate and transfer data with inter node controller 171 on server node 150. With regard to DMA transfers, inter node controllers 121, 131, 161 and 171 are capable of transferring data independent from utilizing processing capabilities (e.g., processor cores 126, 136, 166 and 176) of processor chips 120, 130, 160 and 170.

PHB controllers 122, 132, 162 and 172 facilitate interaction between components of respective processor chips 120, 130, 160 and 170, and respective instances of partitionable endpoints 123, 124, 133, 134, 163, 164, 173 and 174, and DRAM 127, 137, 167 and 177. In one embodiment, partitionable endpoints 123, 124, 133, 134, 163, 164, 173 and 174 can utilize PHB controllers 122, 132, 162 and 172 to facilitate and perform DMA data transfers to access and transfer data from memory of server nodes 110 and 150 (e.g., DRAM 127, 137, 167 and 177). In an example embodiment, PHB controllers 122, 132, 162 and 172 interface with respective instances of partitionable endpoints 123, 124, 133, 134, 163, 164, 173 and 174 via PCI and PCIe busses. In one embodiment, PHB controllers 122, 132, 162 and 172 include system a component for tracking statistics. In other embodiments, the component for tracking statistics is located within server nodes 110 and 150, and PHB controllers 122, 132, 162 and 172 include the capability to access and utilize the system software. In example embodiments, the tracking component (e.g., a hypervisor or privileged software) determines and tracks DMA data transfer statistics corresponding to DMA data transfers, such as a translation control entry (TCE) 300 and DMA statistics table 500.

Memory controllers 125, 135, 165 and 175 control and facilitate access to the computer memory of server nodes 110 and 150 (e.g., DRAM 127, 137, 167 and 177). In example embodiments, memory controllers 125, 135, 165 and 175 manage the data flow to and from DRAM 127, 137, 167 and 177 corresponding to DMA data transfers. In other embodiments, memory controllers 125, 135, 165 and 175 can be a separate external component from processor chips 120, 130, 160 and 170, which interact with the processor chips. Memory controllers 125, 135, 165 and 175 can receive DMA requests from respective partitionable endpoints 123, 124, 133, 134, 163, 164, 173 and 174 (e.g., via PHB controllers 122, 132, 162 and 172), and respective processor cores 126, 136, 166 and 176. In an example embodiment, memory controllers 125, 135, 165 and 175 include the capabilities of a Memory Chip Controller (MCC). With regard to DMA transfers, memory controllers 125, 135, 165 and 175 can allow access to data stored on buffers of DRAM 127, 137, 167 and 177 independent from utilizing processing capabilities (e.g., processor cores 126, 136, 166 and 176) of processor chips 120, 130, 160 and 170.

Processor cores 126, 136, 166 and 176 include one or more CPUs of respective processor chips 120, 130, 160 and 170. In embodiments where processor chips 120, 130, 160 and 170 are multi core processors, each instance of processor cores 126, 136, 166 and 176 includes multiple CPUs. Processor chips 120, 130, 160 and 170 utilize processor cores 126, 136, 166 and 176 to perform operations within server nodes 110 and 150.

Intra node controllers 128, 138, 168 and 178 control communications and transfer of data between processor chips on the same server node (e.g., processor chips 120 and 130 on server node 110, and processor chips 160 and 170 on server node 150) through intra node buses 190 and 192. In various embodiments, each instance of intra node controllers 128, 138, 168 and 178 has the capability to communicate and transfer data with any other instance of intra node controllers 128, 138, 168 and 178 that resides on the same server node. For example, intra node controller 128 can communicate and transfer data with intra node controller 138, via an intra node bus 190 on server node 110. With regard to DMA transfers, intra node controllers 128, 138, 168 and 178 are capable of transferring data independent from utilizing processing capabilities (e.g., processor cores 126, 136, 166 and 176) of processor chips 120, 130, 160 and 170.

In an example embodiment, system software such as a hypervisor, may first generate a translation control entry (TCE) for partitionable endpoint 123 and a buffer of a first memory, which is DRAM 177. A hypervisor (also called a virtual machine manager) is a software program that manages multiple operating systems. A hypervisor may then add the TCE into a TCE table in PHB controller 122. PHB controller 122 may then receive a request from partitionable endpoint 123 to perform a DMA data transfer between the partitionable endpoint 123 and a buffer of a first memory, which is DRAM 177. A hypervisor or an operating system kernel may then read the corresponding TCE that employs information concerning the exact location of the buffer and the DMA data transfer activity level (discussed further below).

The PHB controller 122 may then intercept (i.e., pause) the DMA data transfer, and the hypervisor may locate the corresponding TCE and increment the TCE fields. The hypervisor may then determine whether to migrate the buffer from the first memory to a second memory based on whether the buffer is local or remote to partitionable endpoint 123, and based on a DMA data transfer activity level. The hypervisor may determine that DRAM 177 is remote to partitionable endpoint 123, as DRAM 177 is within a different server node (server node 150) than the partitionable endpoint 123 is on (server node 110). The hypervisor may then mark the TCE for migration, and create a priority list for migrating the buffer. For example, the hypervisor may determine that DRAM 127 is closest to the partitionable endpoint 123 and determine that DMA data transfers happen often on DRAM 127, and accordingly mark DRAM 127 as the top candidate for migration. The hypervisor may then migrate the buffer from DRAM 177 to DRAM 127. With the buffer in DRAM 127, the DMA data transfer may then be continued between the partitionable endpoint 123 and the buffer in DRAM 127. After successful migration, system software (such as hypervisor software or operating system) should update TCE fields to reflect new buffer location.

In another example embodiment, PHB controller 122 receives a request from partitionable endpoint 123 to perform a DMA data transfer between the partitionable endpoint 123 and a buffer of a first memory, which is DRAM 137. A hypervisor or operating system kernel then generates a corresponding TCE that employs information concerning the exact location of the buffer and the DMA data transfer activity level (discussed further below).

The PHB controller 122 may then intercept the DMA data transfer and the hypervisor may locate the corresponding TCE and increment the TCE fields. The hypervisor may then read the TCE and determine whether to migrate the buffer from the first memory to a second memory based on whether the buffer is local or remote to partitionable endpoint 123, and based on a DMA data transfer activity level. The hypervisor may then determine that DRAM 137 is remote to partitionable endpoint 123, as DRAM 137 is attached to a different processor chip (processor chip 130) than the partitionable endpoint 123 is attached to (processor chip 120). The hypervisor may then determine the number of bytes being transferred in the DMA data transfer. For example, the number of bytes transferred may be 4 kilobytes. The hypervisor may determine that 4 kilobytes is a large DMA data transfer, and that the 4 kilobytes are above a threshold (i.e., the amount of kilobytes transferred at which a hypervisor determines to migrate a buffer). Accordingly, the hypervisor may then migrate the buffer from DRAM 137 to DRAM 127.

The examples and embodiments below for FIG. 2, FIGS. 3A and 3B, FIG. 4, and FIG. 5 will hereinafter refer to the partitionable endpoints, DRAMs, and other components of the data processing environment 100 of FIG. 1.

Figure 2:
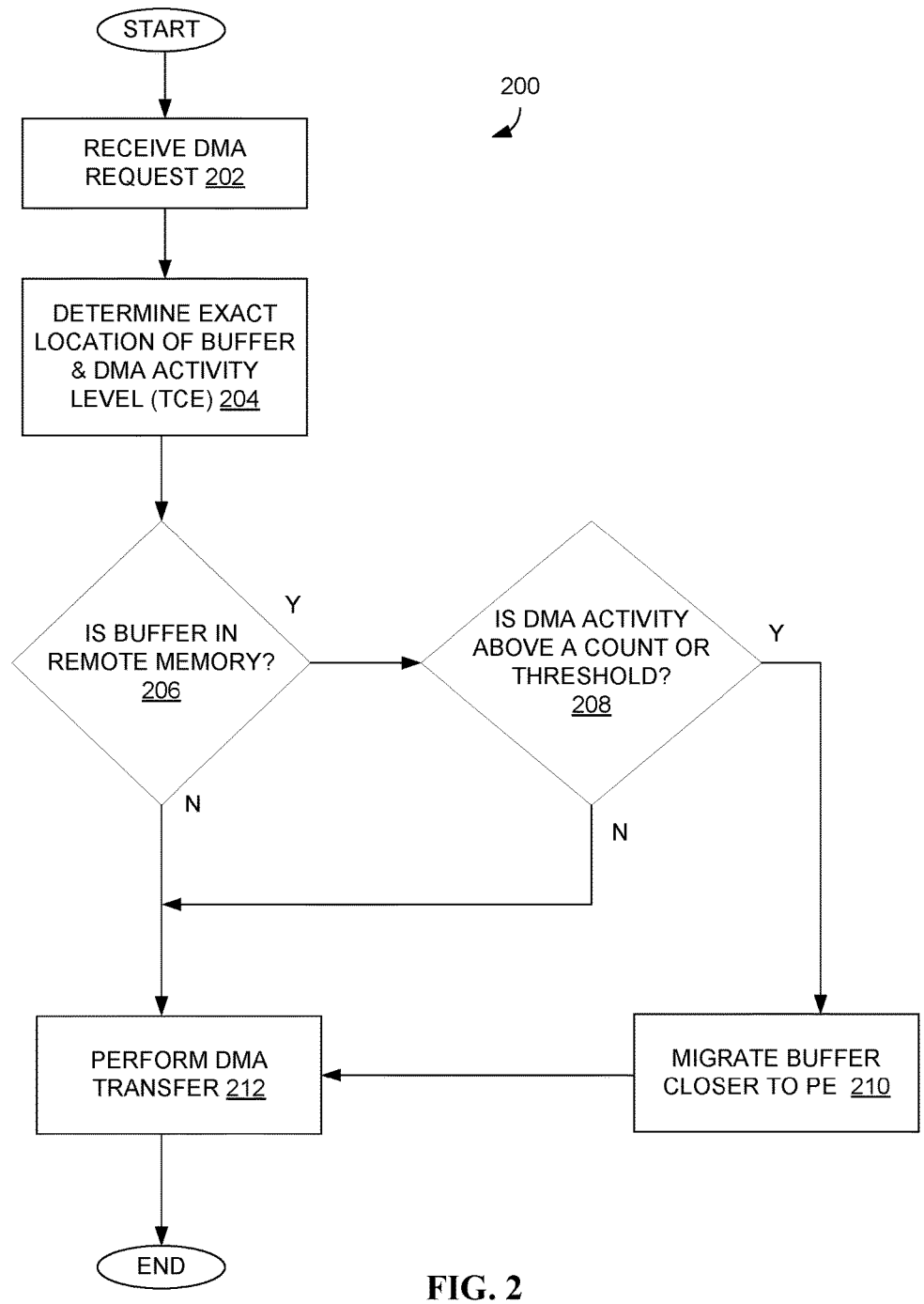
FIG. 2 is a flowchart of an example process for performing a DMA data transfer by determining whether to migrate a memory buffer based on whether the buffer is local or remote to the partitionable endpoint, and based on a DMA data transfer activity level.

FIG. 2 is a flowchart of an example process 200 for performing a DMA data transfer by determining whether to migrate a buffer based on whether the buffer is local or remote to the partitionable endpoint, and based on a DMA data transfer activity level. The process 200 may start with operation 202, wherein a PHB controller (e.g., 122, 132, 162, or 172) receives a request from a partitionable endpoint (e.g., 123, 124, 133, 134, 163, 164, 173, or 174) to perform a DMA data transfer between the partitionable endpoint and a buffer of a first memory (e.g., DRAM 127, 137, 167, or 177). This may occur in a system having two or more processors, each processor having an associated memory and one or more partitionable endpoints. In operation 204, the exact location of the buffer and the DMA activity level (e.g., number of bytes or DMA count) may then be determined by generating and reading a TCE. In operation 206, a hypervisor may decide whether the buffer is within a memory that is remote to the partitionable endpoint performing the DMA data transfer. If the memory is not remote to the partitionable endpoint (i.e., locally attached to the same processor chip), operation 212 may occur to continue the DMA data transfer. If the memory is remote to the partitionable endpoint, a hypervisor may then perform operation 208 to determine whether the DMA activity level is above a count or byte threshold. If the DMA data transfer is above a count or byte threshold, a hypervisor may perform operation 210 to migrate the buffer from a first memory to a second memory that is local to the partitionable endpoint performing the DMA data transfer. If the DMA data transfer activity level is not above a count or threshold, the buffer may not be migrated, and the DMA data transfer may be continued under operation 212. After buffer migration in operation 210, the DMA data transfer may be continued in operation 212.

In operation 204, the exact location of the buffer and a DMA data transfer activity level is determined. This process may include several steps. In an example, responsive to receiving a request to perform a DMA data transfer between partitionable endpoint 163 and a buffer on DRAM 137 (operation 202), a hypervisor determines where the buffer is located within the data processing environment 100. In order to determine where the buffer is located, a hypervisor maps the virtual address of the data buffer to a physical address in the memory (DRAM 137) by utilizing its memory mapping information. After finding a physical address, a hypervisor may create a TCE. A TCE provides information concerning the data buffer requested in a DMA data transfer, and translates virtual addresses of the data (i.e., I/O addresses) into physical system buffer memory addresses.

In various embodiments, a TCE is generated in the form of a table. For example, FIG. 3A is an example of a TCE, and all of the fields (also known as columns) that can reside therein, including a "number of bytes in DMA transfer" field. The TCE 300 may be generated before a request is made to perform a DMA data transfer. TCE 300 is a table that includes fields corresponding to data of: a real page number (RPN), access control (e.g., read-only (RO), write-only (WO), read/write (RW)), a processor chip address, and a number of bytes that are transferred over a partitionable endpoint for a particular DMA data transfer.

A hypervisor may populate the RPN field with data corresponding to the specific physical location of the buffer in the memory where the data being accessed for the DMA data transfer is stored. A hypervisor populates the access control field with data corresponding to the access capabilities of the data being accessed for the DMA data transfer (e.g., whether the DMA data transfer is RO, WO, or RW). A hypervisor populates the processor chip number field with data corresponding to which processor chip (e.g., processor chips 120, 130, 160 or 170) is attached to the memory (e.g., DRAM 127, 137, 167 or 177) where the buffer is located. The processor chip field may provide the hypervisor an alternative indication of where the buffer is located when deciding where to migrate the buffer. In an embodiment, the buffer location may be determined when a hypervisor determines that a buffer is located on server node 110, processor chip 130, and DRAM 137—the output data value in the processor chip TCE field would be processor chip 130. For example, if the DMA data transfer request includes a request for partitionable endpoint 163 to access data stored on a buffer in DRAM 137 of processor chip 130, the hypervisor may then populate the processor chip field with a data indication corresponding to processor chip 130. A hypervisor may also perform operation 204 to determine a DMA data transfer activity level by reading a TCE that includes a field that tracks the number of bytes that are transferred over a partitionable endpoint in a DMA data transfer, as shown in TCE 300. For example, the number of bytes field may indicate the number of bytes transferred in a DMA data transfer between partitionable endpoint 163, and a buffer within DRAM 137. In the shown embodiment of TCE 300, the buffer is located on RPN 18, the DMA data transfer is a RO (read only), the buffer is located on processor chip 130, and the number of bytes in the DMA data transfer is 4 Kilobytes. In an embodiment, a hypervisor may not populate the number of bytes field until the PHB controller intercepts the DMA data transfer after generating and reading the other fields of the TCE 300.

FIG. 3B is another example of a TCE, which includes a "DMA count performed on buffer" field. TCE 320 may be also be generated as part of operation 204 for determining a DMA data transfer activity level by reading a TCE 320 that includes a field that tracks a quantity of DMA data transfers that a particular partitionable endpoint has performed to a particular buffer. (i.e., the DMA count performed on buffer field).

In example embodiments, a hypervisor can utilize the RPN to determine the corresponding processor chip. In other embodiments, a TCE can be an entry in an input/output memory management unit (IOMMU). For example, a TCE can be a DMA translation table entry (TTE), which is contained, along with additional entries, in a DMA translation table, which may be a component of an IOMMU. In another embodiment, a hypervisor generates the TCE entry, and stores the TCE entry in the corresponding instance of statistics database 115 or 155.

Figure 4:
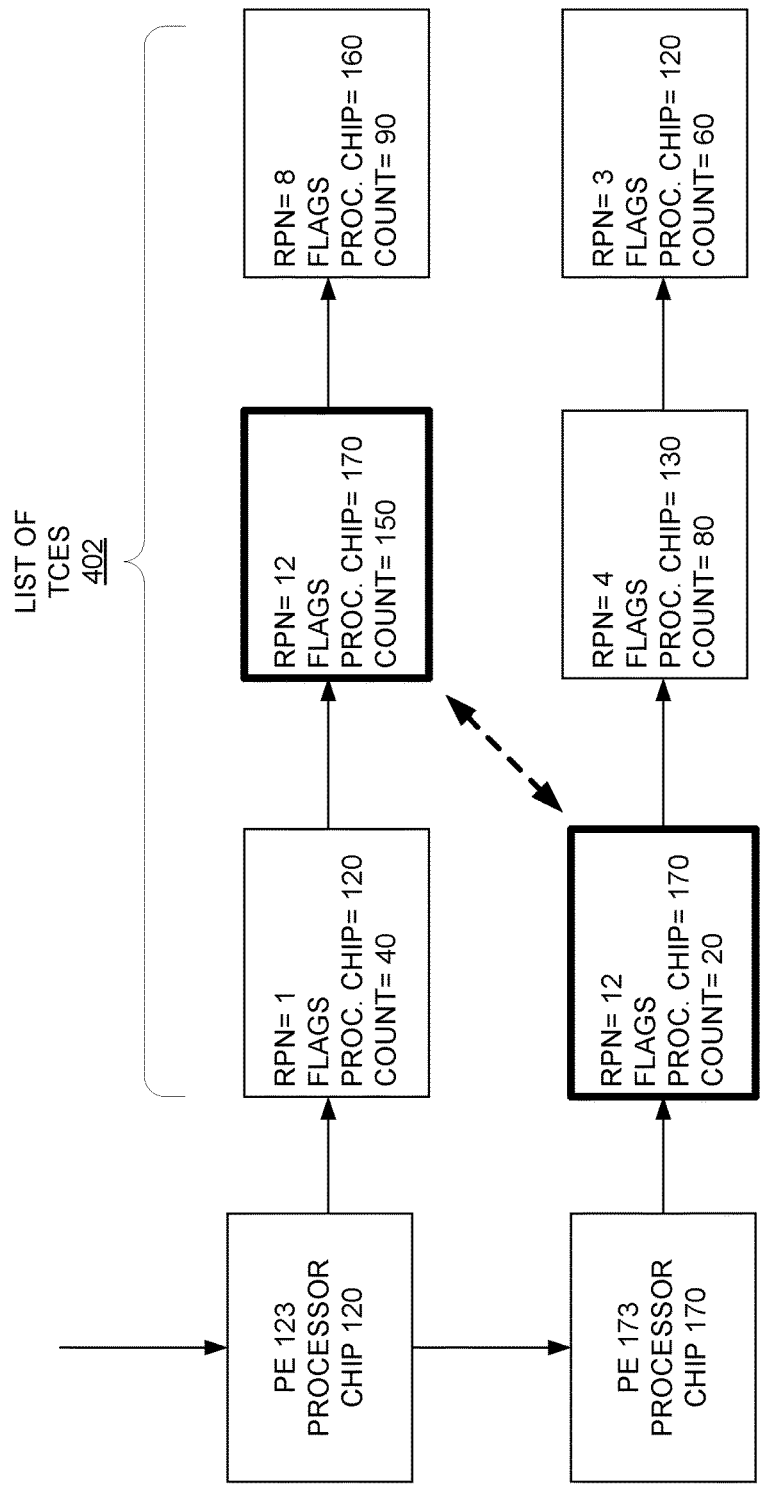
FIG. 4 is an illustrative diagram of two partitionable endpoints and all of their corresponding TCEs.

In an embodiment, in order to track an amount of DMA data transfers that a plurality of partitionable endpoints have performed to a buffer for the entire data processing environment 100, a hypervisor may scan the plurality of partitionable endpoints' TCEs and compare a particular RPN (i.e., buffer) of all of the partitionable endpoints to a count number (i.e., amount of DMA data transfers performed to the RPN). For example, FIG. 4 is an illustrative diagram of two partitionable endpoints and all of their corresponding TCEs (i.e., all of DMA data transfers each partitionable endpoint has performed for data within different RPNs of the processing environment 100). In this embodiment, each partitionable endpoint 123 and 173 includes respective lists of TCEs 402. A hypervisor may determine that one partitionable endpoint performs more DMA data transfers than another for a particular buffer. For example, FIG. 4 demonstrates that partitionable endpoint 123 (located on processor chip 120) has performed 150 DMA data transfers (e.g., within the last five minutes) for data within RPN 12, whereas partitionable endpoint 173 (located on processor chip 170) has only performed 20 DMA data transfers. Accordingly, and discussed more below, because partitionable endpoint 123 has performed more DMA data transfers for the same data buffer, the partitionable endpoint's 123 corresponding memory, DRAM 127, may be a candidate to migrate the buffer.

In another embodiment, in order to track the number of DMA data transfers that a plurality of partitionable endpoints have performed to a buffer for the entire data processing environment 100, a hypervisor may create a statistics table. For example, FIG. 5 is a DMA statistics table 500 that shows an example of a cumulative tracking record for DMA data transfers performed in the data processing environment 100 to particular RPNs (i.e., buffers) over a period of time. In one embodiment, after the hypervisor has read all of the partitionable endpoints' TCEs for DMA data transfers occurring to particular buffers, as specified in FIG. 4, the hypervisor may then generate the statistics table 500 and write the corresponding RPN entries from all of the partitionable endpoints' TCEs into the statistics table 500. In alternative embodiments, the method described in FIG. 4 may be the only method utilized to track the number of DMA data transfers that a plurality of partitionable endpoints have performed on a buffer for the entire data processing environment 100 without utilizing the statistics table 500.

FIG. 5 displays a column that includes all of the partitionable endpoints (123, 124, 133, 134, 163, 164, 173, and 174) of the processing environment 100, and four columns that display four particular RPN addresses in the data processing environment 100. The data under the RPN address columns may correspond to an amount of DMA data transfers each partitionable endpoint has made to or from a particular buffer for a given period of time. For example, partitionable endpoint 163 may request to perform a DMA data transfer for data within RPN 40 located within DRAM 137. The DMA statistics table 500 indicates that the partitionable endpoint 163 has performed 15 DMA data transfers for data in RPN 40 in a set period of time, such as a five second span for example. The DMA statistics table 500 also indicates that partitionable endpoints 123 and 124 performed the most DMA data transfers (30 each), and partitionable endpoint 173 performed the lowest amount of DMA data transfers (0) for data in RPN 40. In an embodiment, the higher the number of DMA data transfers between one or more partitionable endpoints and a given RPN, the more likely a hypervisor will migrate the buffer closest to the partitionable endpoints that are performing the most DMA data transfers (discussed in more detail below). For example, partitionable endpoints 123 and 124 are performing the most DMA data transfers (30 each) for RPN 40. Accordingly, a hypervisor may migrate a remote buffer in DRAM 177, closer to partitionable endpoints 123 and 124 in DRAM 127.

Before operation 206 occurs, a PHB controller 122, 132, 162, or 172 may intercept a particular DMA data transfer, and a hypervisor may locate the corresponding TCE and increment or populate the DMA transfer activity TCE fields. For example, a PHB controller 122 may populate the "DMA count performed on buffer" field on table 320 of FIG. 3B by 1 to indicate that that a new DMA data transfer will occur. Accordingly, at a later time the new DMA data transfer may be added to the DMA statistics table 500 to compute the total amount of DMA data transfers that have occurred for a period of time. For example, in the DMA statistics table 500 for partitionable endpoint 123 and RPN 40, the count or number of DMA data transfers may have been updated from 29 to 30 DMA data transfers by utilizing table 320 to place an additional count for partitionable endpoint 123. In another example, PHB controller 122 may intercept a particular DMA transfer and a hypervisor may increment the number of bytes field of TCE 300. In this example, a PHP controller 122 may show that a total number of bytes for the current DMA data transfer is 4 Kilobytes. The total number of bytes data for the entire data processing environment 100 may also be indicated on a statistics table utilized by the hypervisor.

Operation 206 may occur as a part of a hypervisor determining whether to migrate the buffer from a first memory to a second memory based on whether the first memory is local or remote to the partitionable endpoint. In an embodiment, the hypervisor may determine whether the first memory is local or remote by reading a TCE that includes a field that tracks an address of the processor chip that is associated with the first memory, wherein the address is compared to the location of the partitionable endpoint. The "processor chip number" field of a TCE may be the field that tracks an address of the processor chip. In this embodiment, the hypervisor may determine that a first memory is remote if the first memory is located on a different server node than the server node that the partitionable endpoint is on. For example, if there was a DMA data request for partitionable endpoint 163 to access data on a buffer located in DRAM 137, the hypervisor may determine that DRAM 137 is remote because the memory is located on server node 110 (processor chip number 130), whereas the partitionable endpoint 163 is located on server node 150 (processor chip number 160).

In another example, the hypervisor may determine that a first memory is remote simply if the first memory is associated (e.g., attached) with a different processor chip than the partitionable endpoint is associated with, even if both processor chips are on the same node. For example, if there was a request for partitionable endpoint 163 to perform a DMA data request for data located in a buffer on DRAM 177, the hypervisor may determine that DRAM 177 is remote even though the DMA data transfer would occur within the same server node 150. Accordingly, the hypervisor may decide that because partitionable endpoint 163 is connected to processor chip 160, and DRAM 177 is connected to processor chip 170, DRAM 177 is still remote from the partitionable endpoint 163. In an embodiment, a memory may be considered local to a partitionable endpoint when the memory and the partitionable endpoint are associated with a same processor chip. For example, if a DMA data transfer occurred between partitionable endpoint 174 and a buffer on DRAM 177, DRAM 177 may be considered local to partitionable endpoint 174 because both components are connected to the same processor chip 170. In this example, because the memory that includes the buffer is already local to the partitionable endpoint performing the DMA data transfer, there is no need to migrate the buffer according to operation 210 because the buffer cannot be migrated any closer to the partitionable endpoint. Accordingly, in one embodiment, the DMA data transfer may proceed between partitionable endpoint 174 and the buffer in DRAM 177 as part of operation 212.

In operation 208 and in one embodiment, after a hypervisor determines whether a buffer is remote to the partitionable endpoint making the initial DMA data request, the hypervisor may then determine how and if a particular buffer should be migrated based on whether the DMA data transfer activity level between a partitionable endpoint and a buffer is above a threshold. For example, referring back to FIG. 5, the threshold may be if the number of DMA data transfers for a given buffer and partitionable endpoint exceeds 15 DMA data transfers (counts). In this example, partitionable endpoints 123, 124, 133, and 163 meet or exceed this threshold for RPN 40. Accordingly, the RPN 40 may be migrated to any of the partitionable endpoints' respective DRAMs. (i.e., DRAM 127 or DRAM 167) as long as the RPN 40 is migrated closer to the partitionable endpoint making the DMA data request.

In an alternative embodiment, the threshold may be 50 transfers for a given pair of partitionable endpoints that are associated with the same processor chip. For example, if partitionable endpoint 123 was performing a DMA transfer for data located on RPN 40 within DRAM 137, a hypervisor may only migrate the data in RPN 40 to DRAM 127 if both partitionable endpoints 123 and 124 exceeded 50 transfers for the RPN 40. According to FIG. 5, the only pair of partitionable endpoints that exceed 50 DMA data transfers are partitionable endpoints 123 and 124 (30 for partitionable endpoint 123 and 30 for partitionable endpoint 124, which equals 60). Accordingly, because DRAM 127 is more local to partitionable endpoint 123 than DRAM 137, and because partitionable endpoints 123 and 124 have historically performed many DMA transfers for the RPN 40, a hypervisor may decide to migrate the RPN 40 to DRAM 127 to enhance DMA latency and performance. In yet another example, the threshold number may be the highest number of DMA data transfers that a pair of partitionable endpoints have performed for a given buffer on the entire data processing environment 100 to assure that the buffer stays local to the pair of partitionable endpoints that have historically performed the most DMA data transfers.

In another embodiment, the hypervisor may determine, for each partitionable endpoint of the system, a quantity of DMA data transfers to a buffer of a first memory (i.e., DMA count). Moreover, the hypervisor may determine which partitionable endpoint has performed the most DMA data transfers to the buffer of the first memory. Accordingly, the hypervisor may migrate the buffer from the first memory to a second memory that is closest to the partitionable endpoint that is performing the most DMA data transfers. In this embodiment, the hypervisor may create a priority list of possible memory locations to migrate the buffer and choose the memory that is most local to the partitionable endpoint performing the most DMA data transfers. For example, referring back to FIG. 5, if a request for partitionable endpoint 163 to perform a DMA data transfer was made by accessing data on DRAM 137 for RPN 40, a hypervisor may read table 500 and determine that DRAM 127 is the preferred location to place the RPN 40. In this example, the most local location to the partitionable endpoint 163 is within server node 150, processor chip 160, and DRAM 167. However, a hypervisor may determine that partitionable endpoint 163 has only performed a DMA data transfer in RPN 40 only 15 times, which is below the highest count threshold. Accordingly, a hypervisor may choose between placing the buffer in DRAM 127 or DRAM 177, which may be equally remote to the partitionable endpoint 163. As indicated in the table 500, partitionable endpoints 123 and 124 have performed DMA data transfers a total of 60 times (30 for partitionable endpoint 123, and 30 for partitionable endpoint 124) on RPN 40 over a period of time. Further, partitionable endpoints 173 and 174 have only performed DMA data transfers a total of 3 times (0 for partitionable endpoint 173 and 3 for partitionable 174). Accordingly, a hypervisor may decide that because partitionable endpoints 123 and 124 have performed the most DMA data transfers for the RPN 40, and because DMA performance and latency are improved by performing DMA data transfers locally, the RPN 40 will be migrated to DRAM 127, as DRAM 127 is local to the partitionable endpoints 123 and 124.

In this example, a hypervisor may create a migration priority list for the RPN 40 as follows: first choice would be DRAM 127 because partitionable endpoints 123 and 124 have performed the most DMA data transfers in RPN 40 (totaling 60). In one embodiment, 60 DMA data transfers may be the DMA activity level threshold. The second choice may be the most local memory to partitionable endpoint 163, which is DRAM 167, as partitionable endpoints 163 and 164 have performed the second most DMA data transfers for RPN 40 (totaling 20); the third choice may be DRAM 177 because the partitionable endpoints 173 and 174 performed the least amount of DMA data transfers for RPN 40 (totaling 3). The hypervisor may accordingly migrate the RPN 40 from DRAM 137 to DRAM 127 as part of operation 210 discussed further below. In this example, not only is DMA performance enhanced for the original DMA data request between partitionable endpoint 163 and RPN 40, but for future DMA data transfers between partitionable endpoints 123 and 124 and RPN 40. Therefore, a hypervisor may create a priority migration list depending on the number of DMA data transfers each partitionable endpoint has made to a given buffer.

In yet another embodiment, the TCE 300 in FIG. 3 may be utilized to determine if the number of bytes for the DMA data transfer is above a threshold, and if it is, to migrate the buffer accordingly. For example, if a request was made for partitionable endpoint 124 to perform a DMA data transfer to access data within a buffer on DRAM 137, and the transfer amount was only 16 bytes, a hypervisor may decide not to migrate the buffer to DRAM 127 due to the low data transfer amount that would not negatively affect DMA performance. Alternatively, if the transfer amount was 4 kilobytes, the hypervisor may decide to migrate the buffer from DRAM 137 to DRAM 127. In an example, the threshold at which point a hypervisor will migrate the buffer may be 3 kilobytes. In another example, the threshold may be 2 kilobytes. Moreover, the threshold may be any suitable number of bytes.

In yet another embodiment, a hypervisor may migrate a remote buffer by determining a priority migration location list for the buffer based on the DMA data transfer being above a transfer size threshold, and based on the number of DMA data transfers for each partitionable endpoints on the buffer, even though no DMA data transfer threshold has been met. For example, referring back to FIG. 5, if a request for partitionable endpoint 163 to perform a DMA data transfer was made by accessing data on DRAM 137 for RPN 42, a hypervisor may read the table 500 and determine that DRAM 177 is the preferred location to place the RPN 42. In this example, the hypervisor may utilize TCE 300 on FIG. 3A to determine that the DMA data transfer that is 4 kilobytes is above a threshold, such as 3 kilobytes. After the kilobyte threshold has been met, a hypervisor may then decide which memory to migrate the buffer to notwithstanding that a count threshold has not been met. For example, a hypervisor may decide that a DMA data transfer threshold is 15 or higher for any two partitionable endpoints to mark a particular DMA for migration. In FIG. 5 for RPN 42, no pair of partitionable endpoints meet this threshold. However, in this embodiment, the hypervisor may decide that because a byte transfer threshold has already been sufficiently met, a DMA data transfer threshold does not have to be met. Accordingly, the hypervisor may create a migration priority list based on the number of DMA data transfers each pair of partitionable endpoints have made, notwithstanding the transfer amount is low.

In this example, for this embodiment, the first choice for migration may be DRAM 177 because the partitionable endpoints 173 and 174 are attached to DRAM 177 and perform the most DMA data transfers (10). The second choice for migration may be DRAM 127 because DRAM 127 is less remote to partitionable endpoint 163 than DRAM 137 and the attached partitionable endpoints 123 and 124 perform the second most DMA data transfers for RPN 42 (7). The third choice for migration may be DRAM 167 because it is the most local to partitionable endpoint 163, but partitionable endpoints 163 and 164 have only performed a total of 3 DMA data transfers in RPN buffer 42. The last choice, wherein the buffer would not be migrated, is DRAM 137 because DRAM 137 is the most remote to DRAM 167. Further, the attached partitionable endpoints 133 and 134 perform the least amount of DMA data transfers for RPN 42(0).

In an alternative embodiment, a hypervisor may migrate a remote buffer by determining a priority migration location list for the buffer based on the number of DMA data transfers being above a count threshold, even though no byte threshold has been met. For example, referring back to FIG. 5, if a request for partitionable endpoint 163 to perform a DMA data transfer for data on DRAM 137 within RPN 44, a hypervisor may read table 500 and determine that DRAM 127 is the preferred location to migrate the RPN 42. In this example, the hypervisor may utilize a TCE similar to TCE 300 to determine that the DMA data transfer level is not above a threshold, such as 3 kilobytes. However, a hypervisor may still decide which memory to migrate the buffer to notwithstanding that a byte threshold has not been met as long as at least one count threshold is met. For example, a hypervisor may decide that a DMA data transfer count threshold is 13 or higher for any two partitionable endpoints in order to mark a particular DMA for migration. In FIG. 5 for RPN 44, all but one pair of partitionable endpoints meet this threshold. Partitionable endpoints 133 and 134 do not meet this threshold (12). Accordingly, partitionable endpoints' 133 and 134 attached DRAM 137 will not be considered a candidate for buffer migration.

In this example, for this embodiment, the first choice for migration may be DRAM 127 because the partitionable endpoints 123 and 124 are attached to DRAM 127 and perform the most DMA data transfers (43). The second choice for migration may be DRAM 177 because DRAM 127 is less remote to partitionable endpoint 163 than DRAM 137 and the attached partitionable endpoints 173 and 174 perform the second most DMA data transfers for RPN 44 (27). The third choice for migration may be DRAM 167 because it is the most local to partitionable endpoint 163, but partitionable endpoints 163 and 164 have only performed a total of 15 DMA data transfers on RPN 44, which is only 3 counts above the threshold.

In operation 210, a particular buffer may be migrated from a first memory to a second memory where the second memory is local to the partitionable endpoint and the first memory is remote to the partitionable endpoint by not being associated with a same processor chip. For the present disclosure, migration may occur as a result of data gathered in operations 206 and 208. In an example, the hypervisor may receive information that partitionable endpoint 163 is located on server node 150, chip 160, and DRAM 167. It may compare this address of partitionable endpoint 163 to the address of where the buffer is located, which may be server node 110, processor chip 130, and DRAM 137. Accordingly, the hypervisor may decide to migrate the buffer located in DRAM 137 to DRAM 167. Alternatively, the hypervisor may decide to migrate the buffer located in DRAM 137 to DRAM 177, which is still closer to partitionable endpoint 163 than DRAM 137, but on a different processor chip 170 than the partitionable endpoint 163 is connected to, which is processor chip 160. In yet another example, the hypervisor may decide to migrate the buffer located in DRAM 137 to DRAM 127, as DRAM 127 is more local to partitionable endpoint 163 than DRAM 137 because the buffer would not have to be accessed across the additional intra node bus 190 on server node 110, and because of information gathered in operations 206 and 208.

In various embodiments of operation 212, the DMA data transfer may occur based on data gathered from operations 206, 208, or 210. For example, a PHP controller 122 may have intercepted (paused) an original DMA data transfer that was requested between partitionable endpoint 123 and a buffer in DRAM 137, and the hypervisor may migrate the buffer to DRAM 127 according to operation 210. After such migration, the original partitionable endpoint 123 may resume the DMA data request to complete an actual DMA data transfer, except that the buffer is now located in DRAM 127 instead of DRAM 137. In this example, the corresponding TCE "processor chip number" field may be updated from processor chip 130 to processor chip 120. In this example, DMA performance and latency may be enhanced, as partitionable endpoint 123 does not have to cross the intra node bus 190 on server node 110 to access the data from the buffer, but may quickly access the data located on processor chip 120 and DRAM 127.

In another example, a hypervisor may determine that the buffer is not remote from a corresponding partitionable endpoint, in which case the buffer may not be migrated any closer, and the DMA data transfer may be completed for the original DMA data transfer request. For example, a PHP controller 162 may have intercepted an original DMA data transfer that was requested between partitionable endpoint 163 and a buffer in DRAM 167. However, the hypervisor may determine that the buffer in DRAM 167 is the most local to the partitionable endpoint 163 (i.e., they are both attached to the same processor chip 160). In this example, the hypervisor may not migrate the buffer and the DMA data request may continue as planned. In another embodiment, the buffer in DRAM 167 may still be migrated, but as part of a different DMA data transfer. For example, if partitionable endpoints 173 and 174 were performing the most DMA data transfers for the buffer located in DRAM 167, the buffer may be migrated to DRAM 177 (the most local to partitionable endpoints 173 and 174), even though the buffer in DRAM 167 is the most local to partitionable endpoint 163.

FIG. 6 depicts a block diagram of components of computer 600, which is representative of server nodes 110 or 150 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Computer 600 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device. Software and data 522 are stored in persistent storage 508 for access and/or execution by processors 504 via one or more memories of memory 506. With respect to server nodes 110 and 150, software and data 522 represents the statistics tracking component (e.g., a hypervisor) that populates the TCE 300 and table 500 and determines whether to migrate the buffer.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 600. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 522 can be stored on such portable computer readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment. However, it should be appreciated that any particular program nomenclature herein is used merely for convenience, and thus various embodiments should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer readable storage medium having program instructions embodied therewith, the program instructions are executable by at least a controller to cause a computing device to:
    receive a request to perform a DMA data transfer between a first partitionable endpoint device and a buffer of a first memory in a system having two or more processor chips, each processor chip having an associated memory and the each processor chip being physically connected to one or more partitionable endpoint devices, wherein the DMA data transfer includes taking control of a bus from at least one processor and transferring data without the processor executing one or more instructions to perform the DMA data transfer;
    determine whether to migrate the buffer from the first memory to a second memory based on whether the first memory is local or remote to the first partitionable endpoint device, and based on a DMA data transfer activity level, wherein a memory is local to a particular partitionable endpoint when the memory is associated with a same processor chip and the particular partitionable endpoint is physically connected to the same processor chip, and wherein the determining whether the first memory is local or remote includes reading a Translation Control Entry (TCE) that includes a field that tracks an address of the same processor chip;
    perform the DMA data transfer;
    create a migration priority list based on a number of DMA data transfers each of the one or more partitionable endpoint devices has made to the buffer over a particular period of time; and
    select a top candidate partitionable endpoint for migration based on data obtained from the migration priority list, wherein the data is gathered from a statistics table, the statistics table including a first column that specifies an ID of each of the one or more partitionable endpoint devices, and wherein the statistics table further includes a second set of columns that specify each real page number (RPN) of the system, and wherein the statistics table further includes the data, the data corresponding to an amount of DMA data transfers each of the one or more partitionable endpoint devices has made to or from a particular buffer for the particular period of time.

2. The computer program product of claim 1, wherein the program instructions executable by the controller further cause the computing device to migrate the buffer from the first memory to the second memory, wherein the second memory is local to the first partitionable endpoint device and the first memory is remote to the first partitionable endpoint device by not being associated with a same processor chip as the first partitionable endpoint device.

3. The computer program product of claim 1, wherein the DMA data transfer activity level is determined by reading the TCE that includes a field that tracks a quantity of DMA data transfers that the first partitionable endpoint device has performed to the buffer.

4. The computer program product of claim 1, wherein the DMA data transfer activity level is determined by reading a TCE that includes a field that tracks the number of bytes that are transferred over the first partitionable endpoint device in the DMA data transfer.

5. The computer program product of claim 1, wherein the program instructions executable by the controller further cause the computing device to determine the DMA data transfer activity level by:
    determining, for each of the one or more partitionable endpoint devices of the system that is not local to the first memory, a quantity of DMA data transfers to the buffer of the first memory; and
    determining that a partitionable endpoint has performed a most DMA data transfers to the buffer of the first memory.

6. The computer program product of claim 1, wherein the program instructions executable by the controller further cause the computing device to migrate the buffer from the first memory to the second memory based on the partitionable endpoint performing the most DMA data transfers to the buffer of the first memory, wherein the second memory is local to the partitionable endpoint.

7. The computer program product of claim of claim 1, wherein the program instructions executable by the controller further cause the computing device to migrate the buffer from the first memory to the second memory, wherein the second memory is local to the first partitionable endpoint device, and the DMA data transfer activity level between the first partitionable endpoint device and the buffer is above a threshold.

8. A computer-implemented method for migrating a buffer used for direct memory access (DMA), comprising:
    receiving a request to perform a DMA data transfer between a first partitionable endpoint device and a buffer of a first memory;

determining whether to migrate the buffer from the first memory to a second memory based on whether the first memory is local or remote to the first partitionable endpoint device, and based on a DMA data transfer activity level, wherein a memory is local to a particular partitionable endpoint device when the memory and the particular partitionable endpoint device are directly connected with a same processor chip;

in response to the first memory being remote and the DMA data transfer activity level being above the threshold, migrating the buffer from the first memory to the second memory; and performing the DMA data transfer;

wherein the determining is based on at least data gathered from a statistics table, the statistics table includes a first field that specifies an ID of each of the one or more partitionable endpoint devices, and wherein the statistics table further includes a second set of fields that specify each real page number (RPN), and wherein the statistics table further includes the data, the data corresponds to an amount of DMA data transfers each of the one or more partitionable endpoint devices has made to or from a particular buffer for a particular period of time.

9. The method of claim 8, further comprising determining whether the first memory is local or remote by reading a translation control entry ("TCE") that includes a field that tracks an address of the processor chip that is associated with the first memory, wherein the address is compared to a location of the first partitionable endpoint device.

10. The method of claim 8, wherein the DMA data transfer activity level is determined by reading a TCE that includes a field that tracks a quantity of DMA data transfers that the first partitionable endpoint device has performed to the buffer and a field that tracks the number of bytes that are transferred over the first partitionable endpoint in the DMA data transfer.

11. The method of claim 8, further comprising determining the DMA data transfer activity level by:

determining, for each of the one or more partitionable endpoint devices of the system that is not local to the first memory, a quantity of DMA data transfers to the buffer of the first memory; and determining that a partitionable endpoint has performed a most DMA data transfers to the buffer of the first memory.

12. The method of claim 11, further comprising migrating the buffer from the first memory to the second memory based on the partitionable endpoint performing the most DMA data transfers to the buffer of the first memory, wherein the second memory is local to the partitionable endpoint device.

13. The method of claim 8, further comprising migrating the buffer from the first memory to the second memory, wherein the second memory is local to the first partitionable endpoint device, and the DMA data transfer activity level between the first partitionable endpoint device and the buffer is above a threshold.

14. A system for migrating a buffer used for direct memory access (DMA), the system comprising:

two or more server nodes;

two or more processor chips within the two or more server nodes;

a respective memory attached to each of the two or more processor chips;

two or more partitionable endpoints being physically connected to each of the two or more processor chips;

a first PCI host bridge (PHB) controller configured to receive a request to perform a DMA data transfer between a first partitionable endpoint device and a buffer of a first memory, wherein each of the two or more processor chips are further connected to the first PHB controller, the first PHB controller interfacing with the two or more partitionable endpoints;

wherein the first PHB controller further pauses the DMA data transfer;

wherein the first PHB controller further determines, in response to the pausing, whether to migrate the buffer from the first memory to a second memory based on whether the first memory is local or remote to the first partitionable endpoint device, and based on a DMA data transfer activity level, wherein a memory is local to a particular partitionable endpoint when the memory is associated with a same processor chip and the particular partitionable endpoint is physically connected to the same processor chip, wherein the determining is based on at least data gathered from a statistics table, the statistics table includes a first field that specifies an ID of each of the one or more partitionable endpoint devices, and wherein the statistics table further includes a second set of fields that specify each real page number (RPN), and wherein the statistics table further includes the data, the data corresponds to an amount of DMA data transfers each of the one or more partitionable endpoint devices has made to or from a particular buffer for a particular period of time; and wherein the first PHB controller further resumes the DMA data transfer, wherein the DMA data transfer includes taking control, by the first PHB controller, of a bus from a processor and transferring data without the processor executing one or more instructions to complete the transferring of data.

* * * * *